US012517452B2

(12) United States Patent
Kitajima et al.

(10) Patent No.: US 12,517,452 B2
(45) Date of Patent: Jan. 6, 2026

(54) IMAGE FORMING APPARATUS WITH PRESSURE BONDING

(71) Applicant: CANON KABUSHIKI KAISHA, Tokyo (JP)

(72) Inventors: Kenichiro Kitajima, Ibaraki (JP); Shingo Hirota, Ibaraki (JP); Kota Mori, Chiba (JP); Naoyuki Yamamoto, Chiba (JP); Shuichi Tamura, Ibaraki (JP); Tohru Nakaegawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 18/668,525

(22) Filed: May 20, 2024

(65) Prior Publication Data

US 2024/0393722 A1 Nov. 28, 2024

(30) Foreign Application Priority Data

May 22, 2023 (JP) ................................ 2023-084113

(51) Int. Cl.
*G03G 15/20* (2006.01)
*G03G 15/00* (2006.01)

(52) U.S. Cl.
CPC ..... *G03G 15/5016* (2013.01); *G03G 15/2039* (2013.01); *G03G 15/2064* (2013.01); *G03G 15/6585* (2013.01)

(58) Field of Classification Search
USPC ........................................................ 399/81
See application file for complete search history.

(56) References Cited

U.S. PATENT DOCUMENTS 11,772,408 B2 10/2023 Tsukada
2016/0313681 A1* 10/2016 Matsuo ................ G03G 15/652
2023/0062516 A1 3/2023 Hatanaka
2023/0068570 A1 3/2023 Tamura
2024/0085834 A1 3/2024 Tamura
2024/0190679 A1 6/2024 Kitajima
2024/0192626 A1 6/2024 Nakaegawa
2024/0192627 A1 6/2024 Tsukada
2024/0192628 A1 6/2024 Mori

FOREIGN PATENT DOCUMENTS

JP 2014-035454 A 2/2014
JP 2015-038584 A 2/2015
JP 2015-171925 A 10/2015
JP 2023-034126 A 3/2023

* cited by examiner

*Primary Examiner* — Quana Grainger
(74) *Attorney, Agent, or Firm* — Venable LLP

(57) ABSTRACT

An image forming apparatus includes an image forming portion, a fixing portion, an input portion to which a kind of a pressure-bonding print which is a recording material on which an image is formed on a surface thereof and which is folded and bonded at the surface is inputted, a display portion, and a controller. The controller causes the display portion to display a message before the image is formed on the pressure-bonding print when a kind of the pressure-bonding print inputted by the input portion is a first kind such that an adhesive is applied to a first region of the surface and is not applied to a second region inside the first region in a case that the image is formed on the pressure-bonding print by the image forming portion.

12 Claims, 14 Drawing Sheets

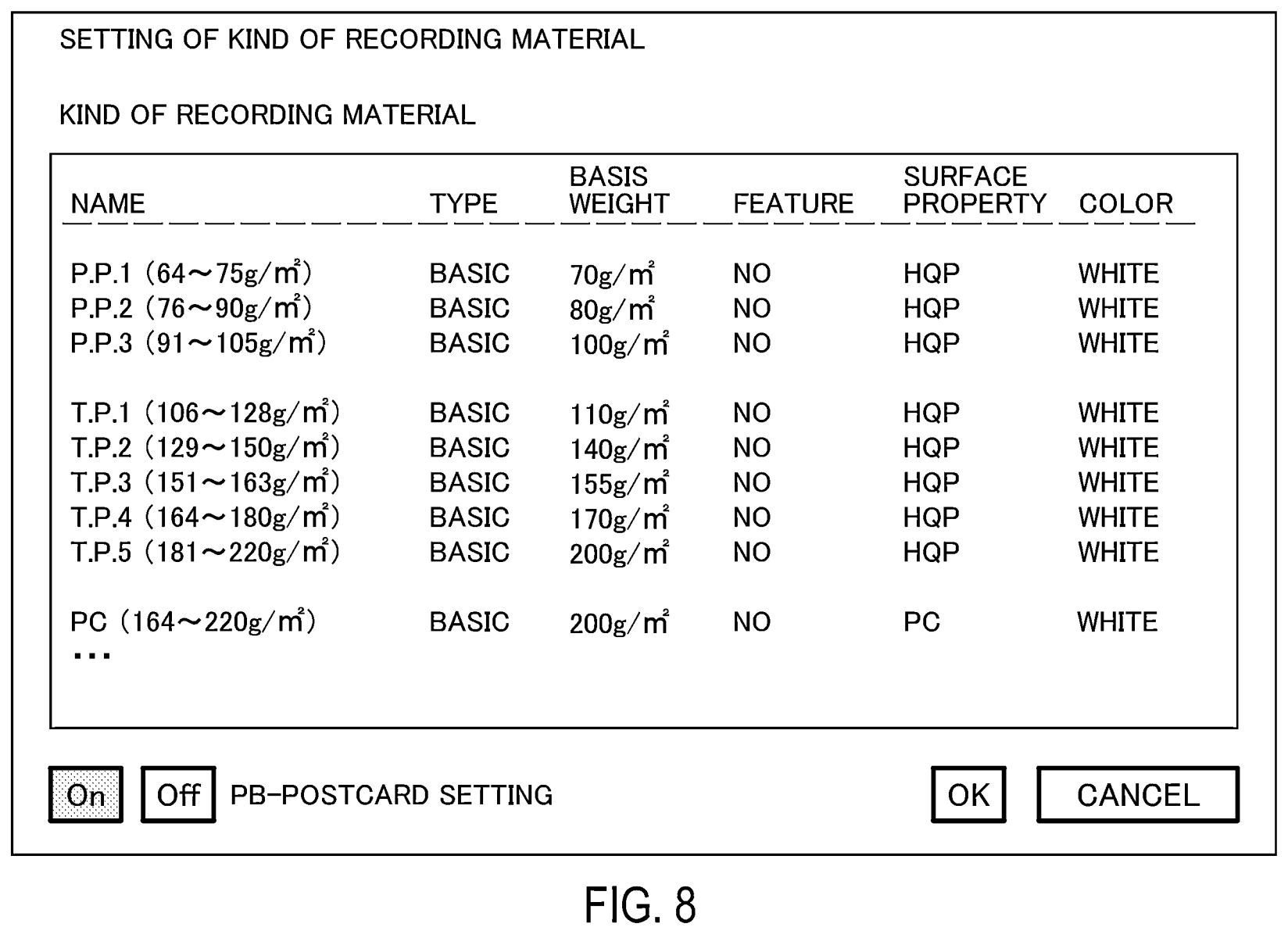

SETTING OF KIND OF RECORDING MATERIAL

KIND OF RECORDING MATERIAL

| NAME | TYPE | BASIS WEIGHT | FEATURE | SURFACE PROPERTY | COLOR |
|---|---|---|---|---|---|
| P.P.1 (64～75g/m²) | BASIC | 70g/m² | NO | HQP | WHITE |
| P.P.2 (76～90g/m²) | BASIC | 80g/m² | NO | HQP | WHITE |
| P.P.3 (91～105g/m²) | BASIC | 100g/m² | NO | HQP | WHITE |
| T.P.1 (106～128g/m²) | BASIC | 110g/m² | NO | HQP | WHITE |
| T.P.2 (129～150g/m²) | BASIC | 140g/m² | NO | HQP | WHITE |
| T.P.3 (151～163g/m²) | BASIC | 155g/m² | NO | HQP | WHITE |
| T.P.4 (164～180g/m²) | BASIC | 170g/m² | NO | HQP | WHITE |
| T.P.5 (181～220g/m²) | BASIC | 200g/m² | NO | HQP | WHITE |
| PC (164～220g/m²) | BASIC | 200g/m² | NO | PC | WHITE |
| ... | | | | | |

On Off PB-POSTCARD SETTING OK CANCEL

FIG. 8

(a)
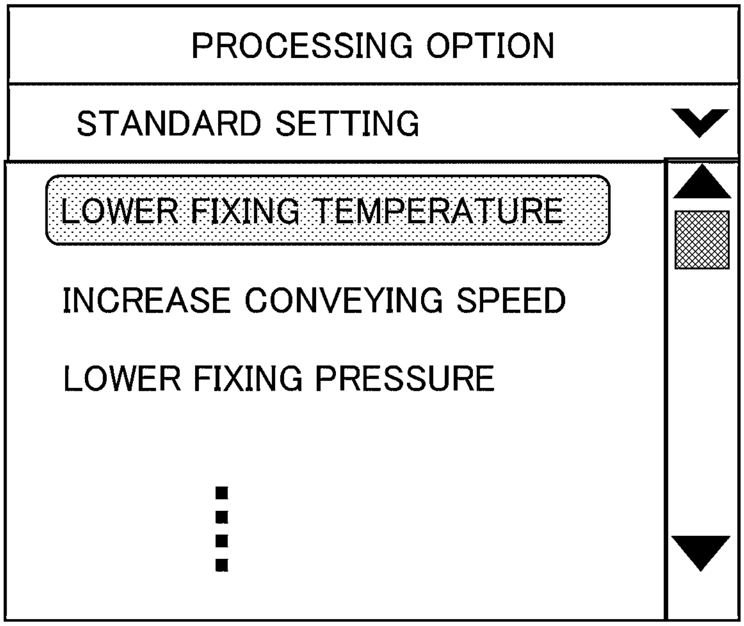
(b)
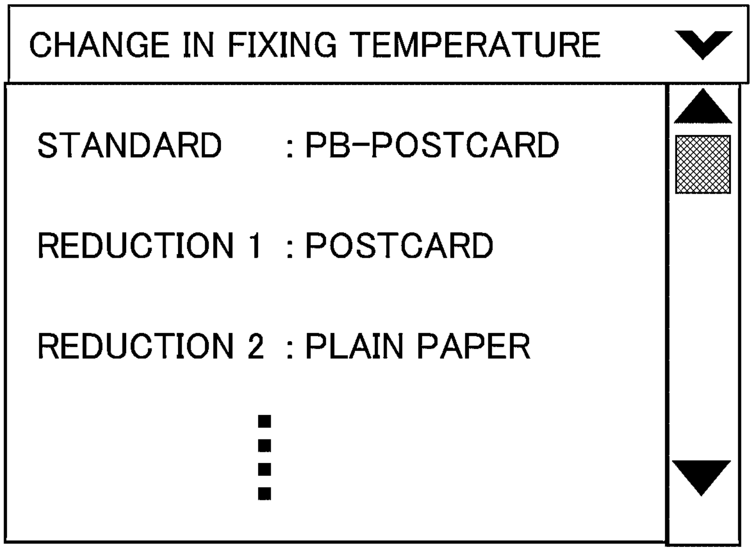
FIG. 13

IMAGE FORMING APPARATUS WITH PRESSURE BONDING

FIELD OF THE INVENTION AND RELATED ART

The present invention relates to an image forming apparatus, such as a printer, a copying machine, a facsimile machine, or a multi-function machine, utilizing electrophotography.

Conventionally, the image forming system capable of preparing a pressure-bonding print (printed matter) excellent in confidentiality of information has been proposed (Japanese Laid-Open Patent Application (JP-A) 2014-35454).

As the pressure-bonding print, it is possible to cite, for example, a pressure-bonding postcard such that opposing surfaces each on which personal information is formed as an image are superposed and pseudo-bonded together, and a user cannot read the personal information until the opposing surfaces pseudo-bonded together are peeled off from each other. The pressure-bonding print is prepared by forming an image relating to information desired to be kept secret by a user (herein, this information is referred to as a confidential image) on a paste surface where a paste is applied onto a recording material and then by folding and pseudo-bonding the recording material under application of heat and pressure. Here, pseudo-bonding refers to one form of bonding such that the recording material is peelable after the bonding and is not readily bonded again after the peeling.

Incidentally, on a front surface and a back surface of the pressure-bonding print, an image such as an address is capable of being separately formed by the image forming apparatus. In the image forming apparatus utilizing the electrophotography, a toner image is formed with toner on the pressure-bonding print, and thereafter, heat and pressure are applied to the pressure-bonding print, so that the toner image is fixed on the pressure-bonding print.

However, in the case where an image is formed on the prepared pressure-bonding print, there is a liability that peeling occurs on the image inside the pressure-bonding print and thus a quality of the image lowers.

SUMMARY OF THE INVENTION

According to an aspect of the present invention, there is provided an image forming apparatus comprising: an image forming portion configured to form an image on a recording material; a fixing portion configured to fix the image, on the recording material, formed by the image forming portion; an input portion to which a kind of a pressure-bonding print which is the recording material on which the image is formed on a surface thereof and which is folded and bonded at the surface is inputted; a display portion configured to display a message; and a controller configured to cause the display portion to display a message before the image is formed on the pressure-bonding print when the kind of the pressure-bonding print inputted by the input portion is a first kind such that an adhesive is applied to a first region of the surface and is not applied to a second region inside the first region in a case that the image is formed on the pressure-bonding print by the image forming portion.

Further features of the present invention will become apparent from the following description of exemplary embodiments with reference to the attached drawings.

Figure 4:
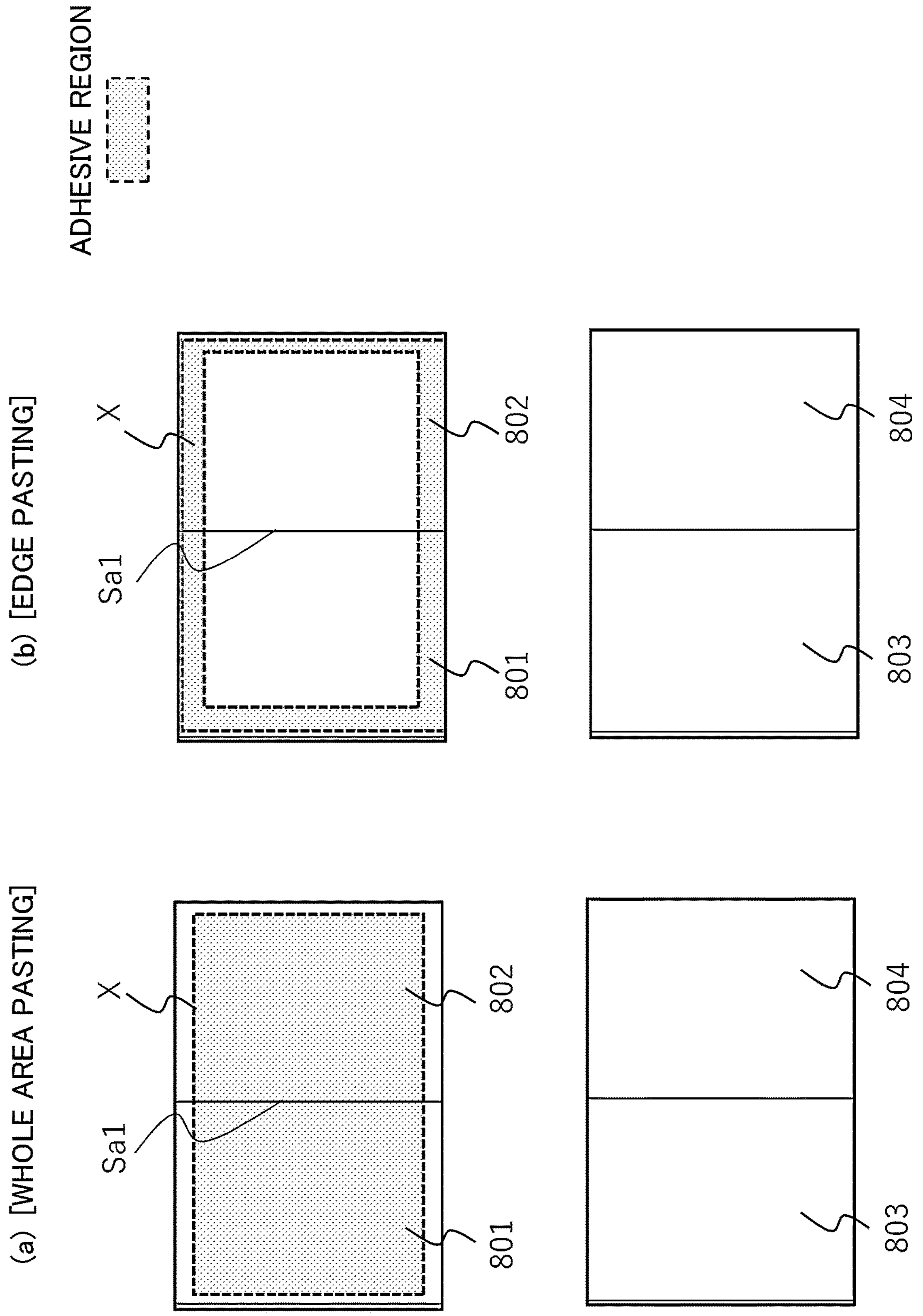

Parts (a) and (b) of FIG. 4 are schematic views each showing a two-fold pressure-bonding sheet, in which part (a) shows a whole area pasting type, and part (b) shows an edge pasting type.

Figure 5:
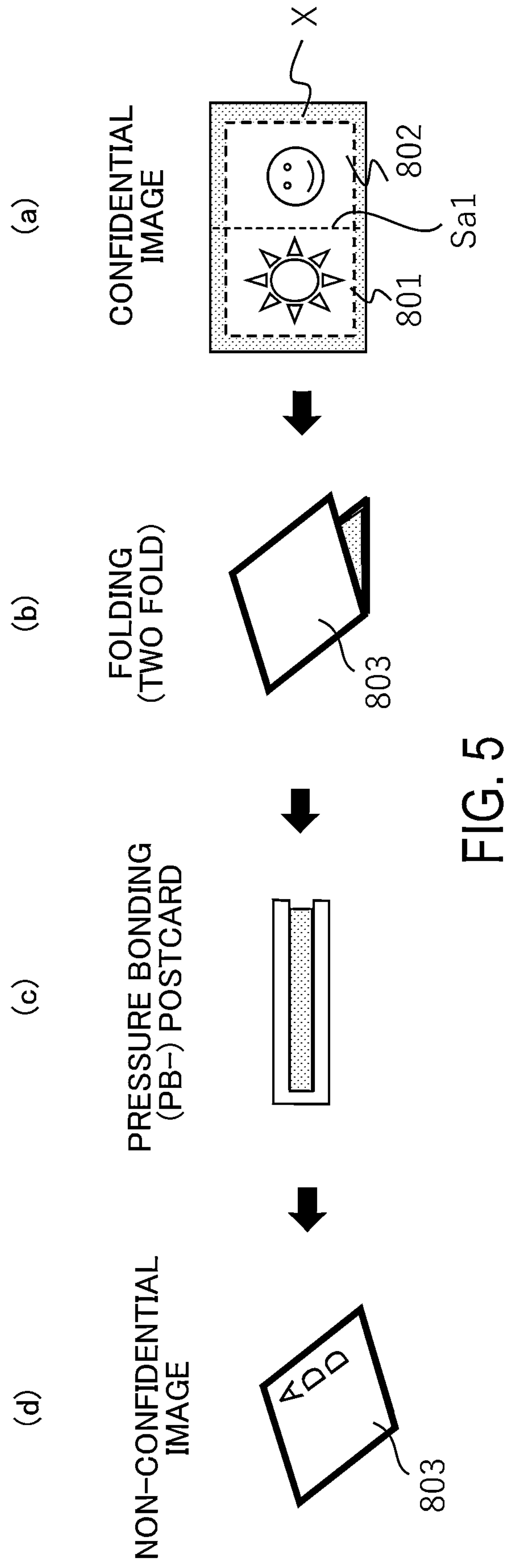

Parts (a) to (d) of FIG. 5 are schematic views for illustrating a pressure-bonding print preparing process, in which part (a) shows a state in which confidential images are formed on the pressure-bonding sheet, part (b) shows a state in which the pressure-bonding sheet is folded, part (c) shows a cross section of a pressure-bonding postcard, and part (d) shows a state in which a non-confidential image is formed on the pressure-bonding postcard.

Figure 6:
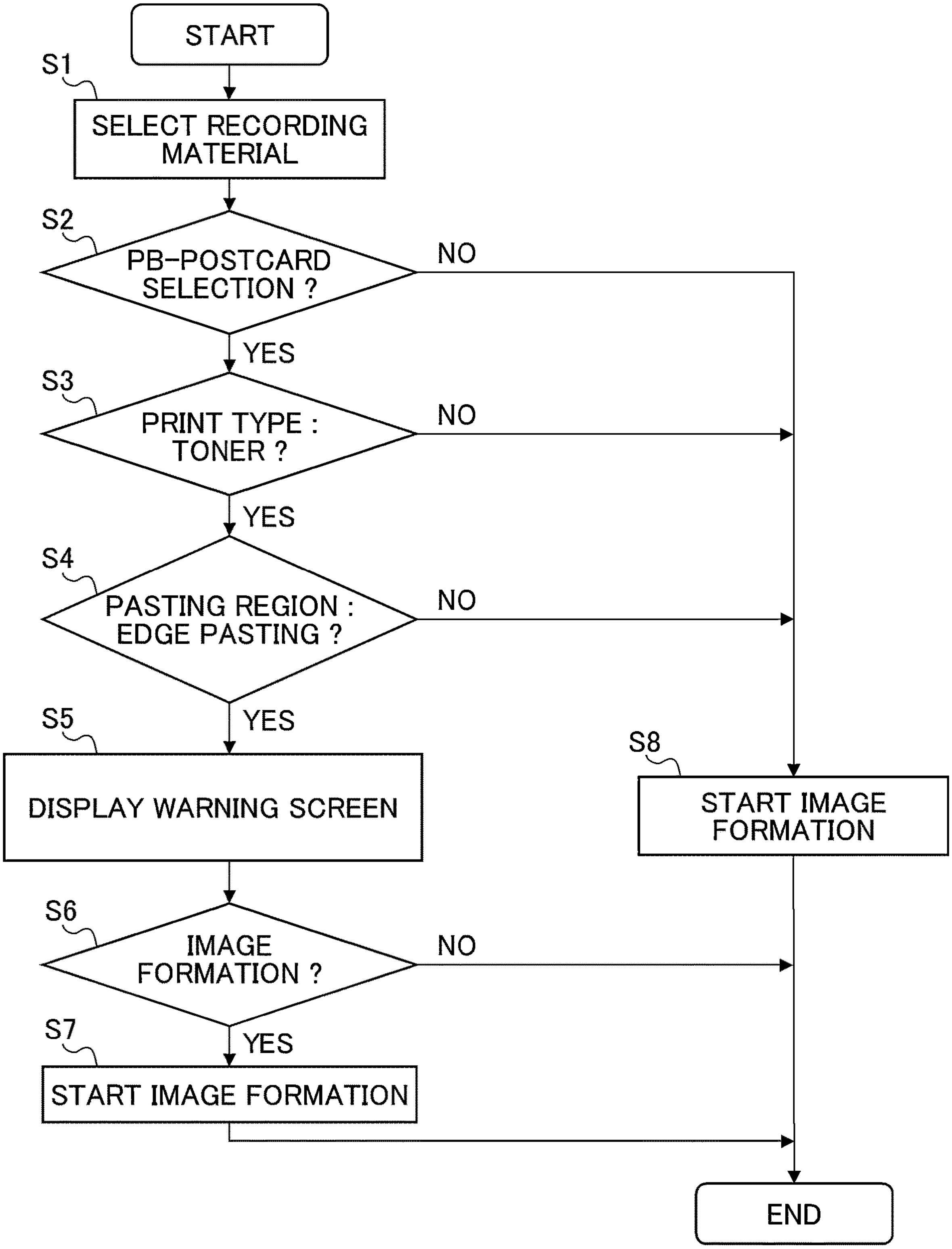

FIG. 6 is a flowchart showing an image forming processing (process) in a first embodiment.

Figure 7:
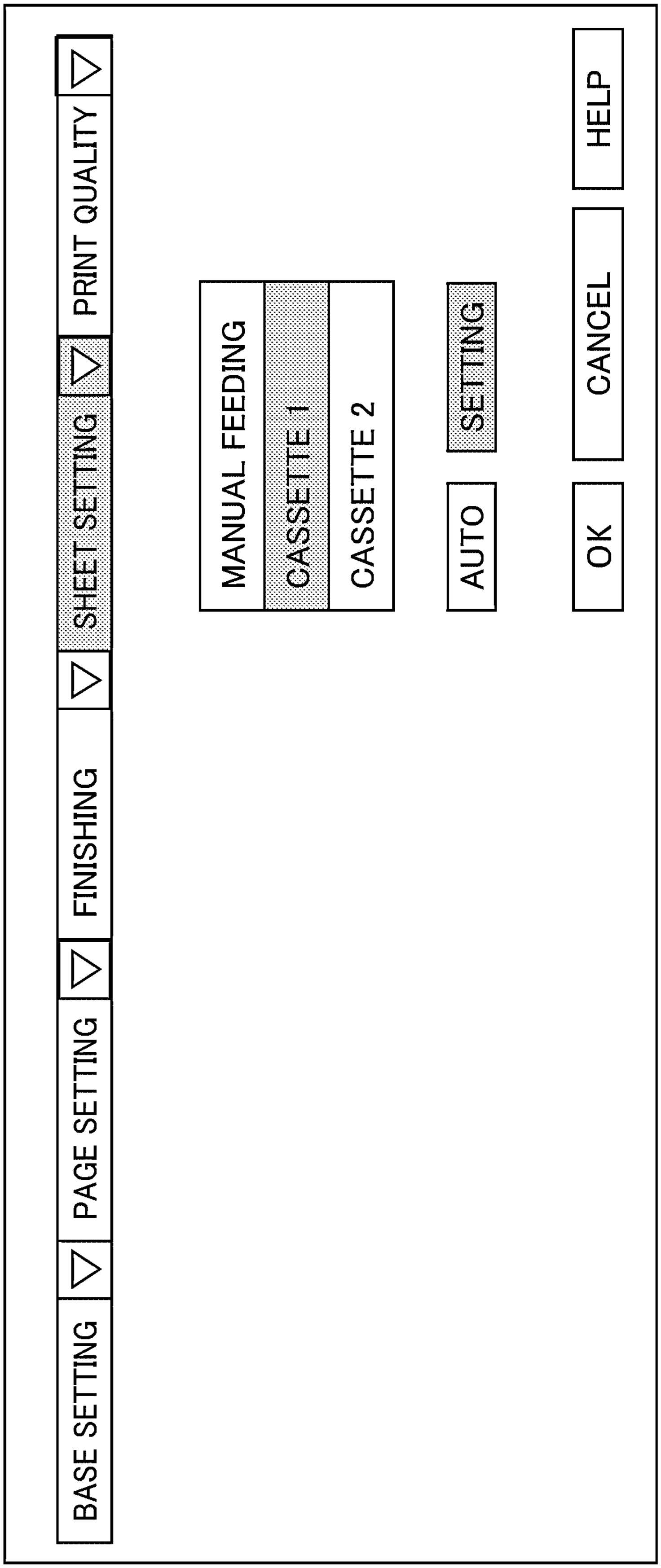

FIG. 7 is a schematic view showing a "set portion selecting screen".

FIG. 8 is a schematic view showing a "recording material kind selecting screen".

Figure 9:
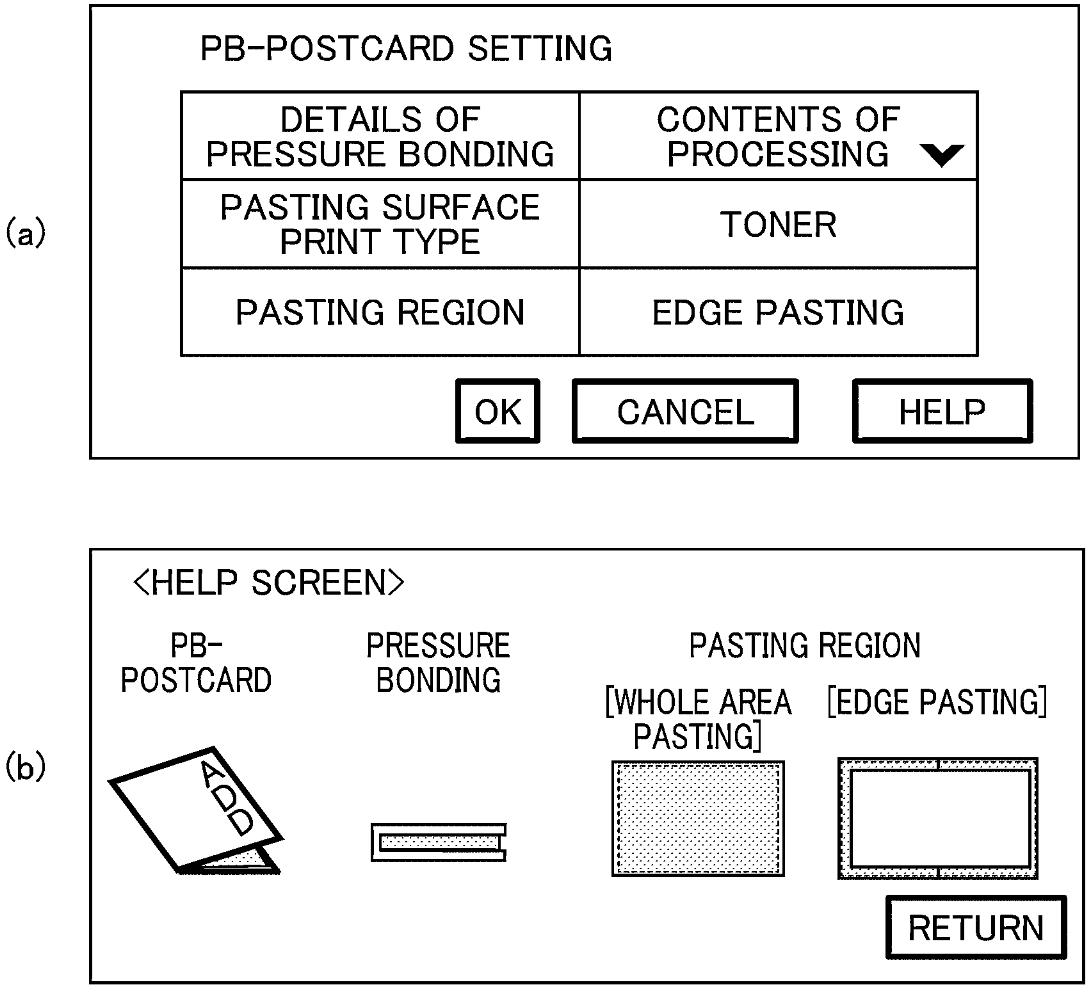

Part (a) of FIG. 9 is a schematic view showing a "pressure-bonding postcard setting screen", and part (b) of FIG. 9 is a schematic view showing a "help screen".

Figure 10:
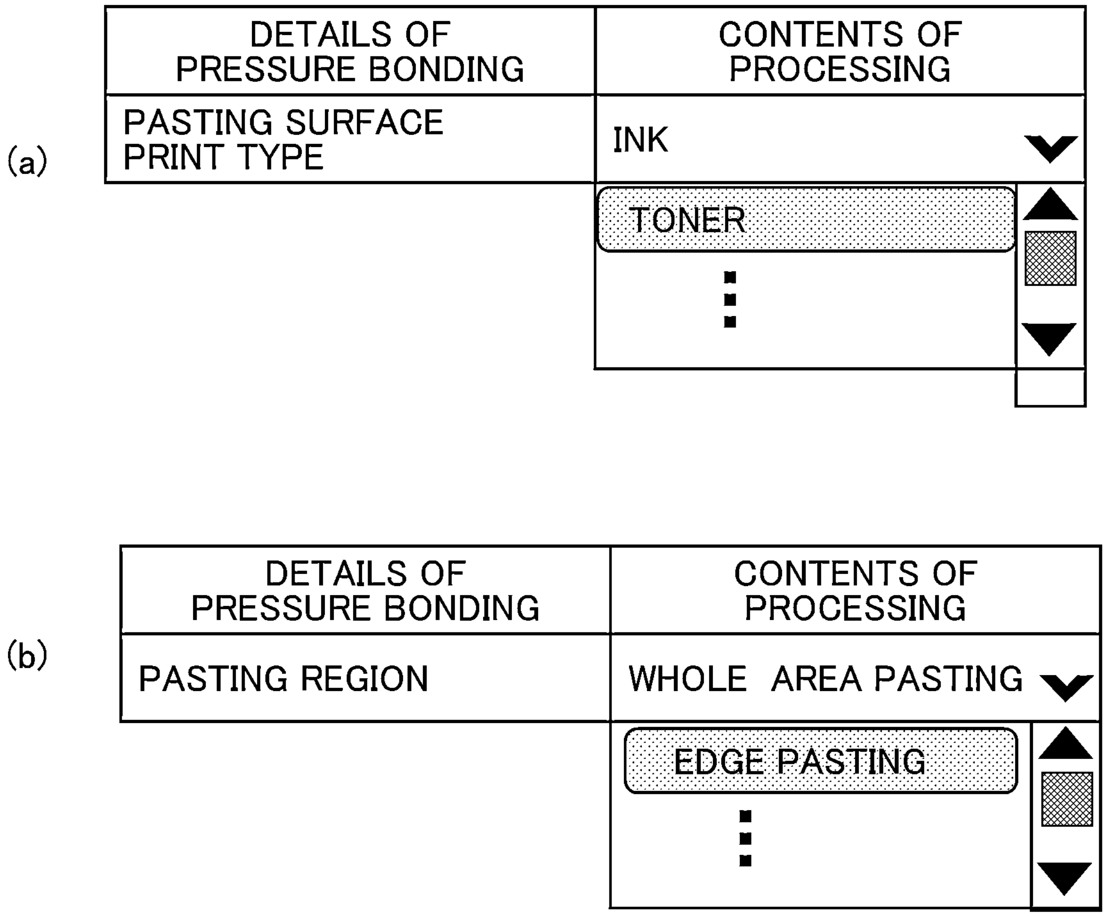

Part (a) of FIG. 10 is a schematic view showing a "paste surface print type selecting screen", and part (b) of FIG. 10 is a schematic view showing a "pasting region selecting screen".

Figure 11:
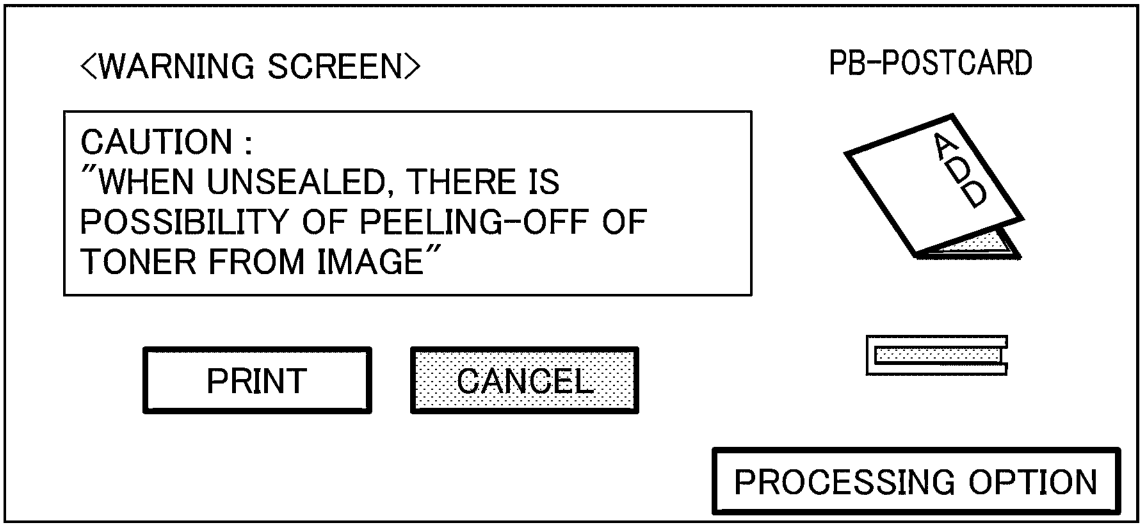

FIG. 11 is a schematic view showing a "warning screen".

Figure 12:
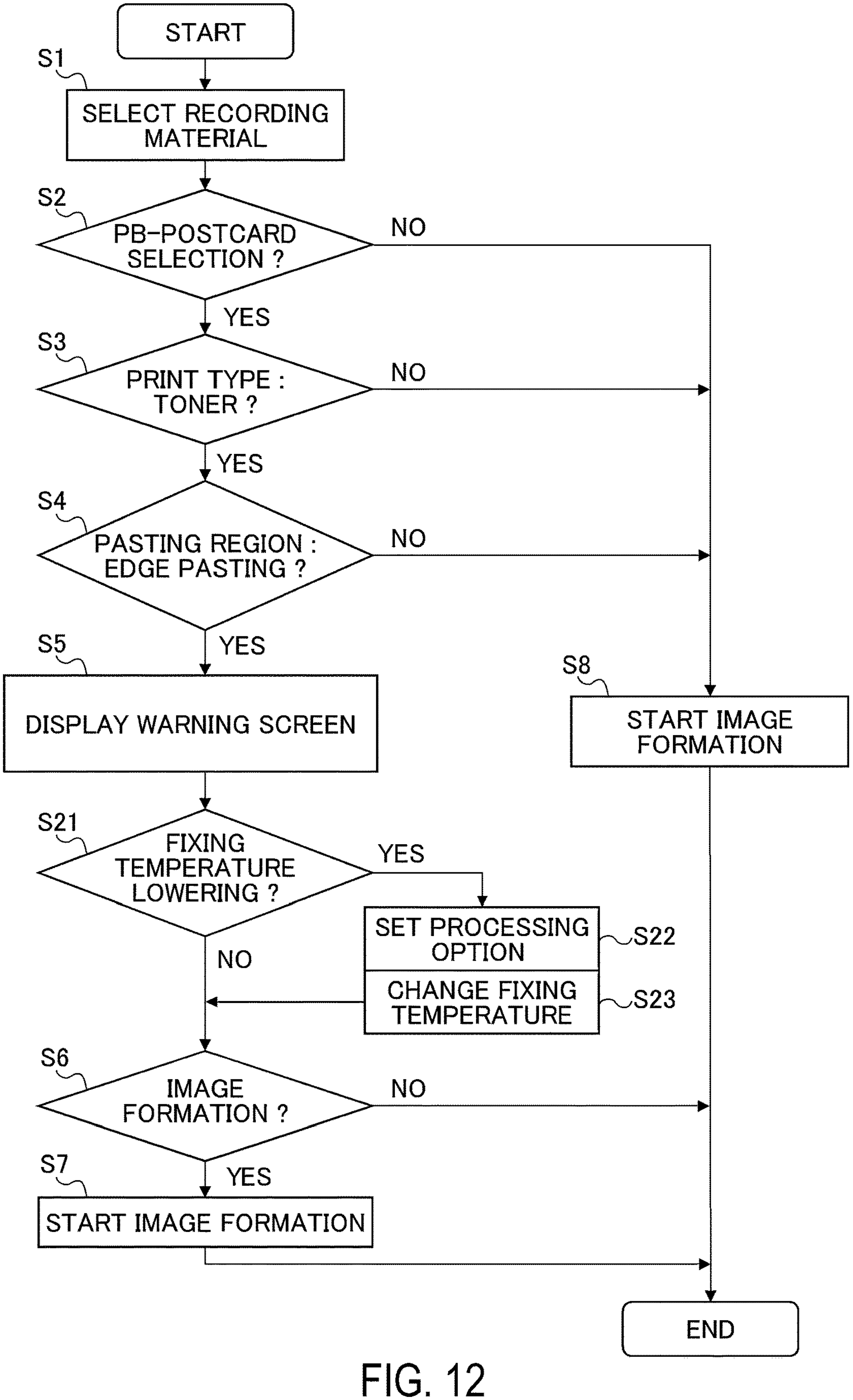

FIG. 12 is a flowchart showing an image forming processing in a second embodiment.

Part (a) of FIG. 13 is a schematic view showing a "processing option selecting screen", and part (b) of FIG. 13 is a schematic view showing a "fixing temperature changing screen".

Figure 14:
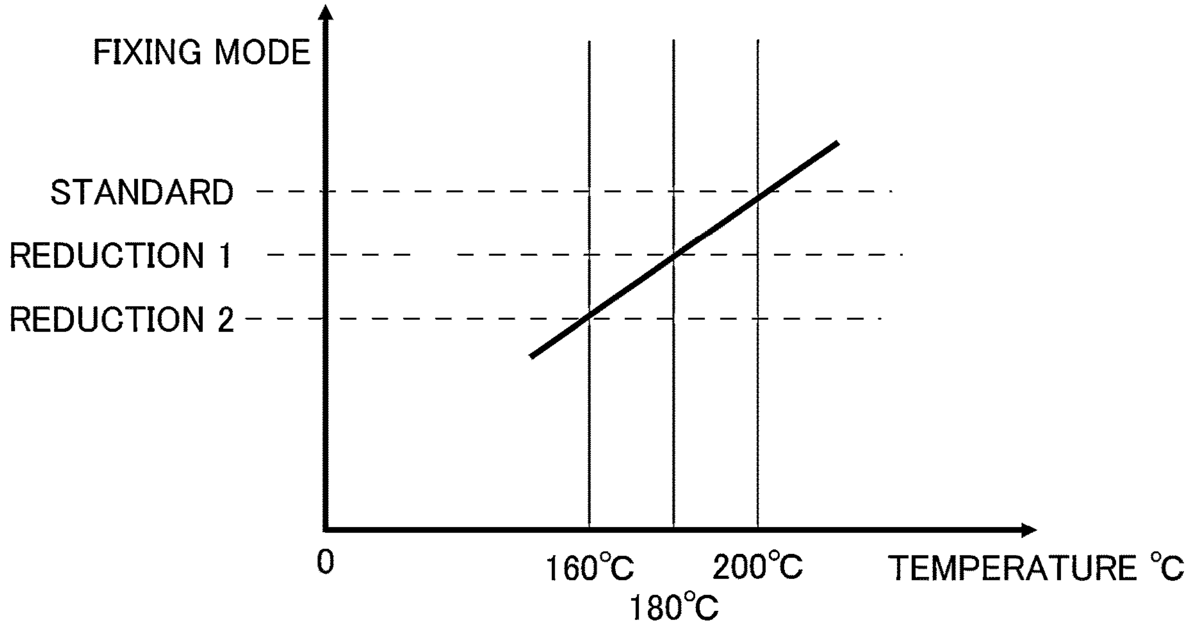

FIG. 14 is a graph showing a relationship between a fixing mode and a fixing temperature.

DESCRIPTION OF THE EMBODIMENTS

First Embodiment

<Image Forming Apparatus>

Figure 1:
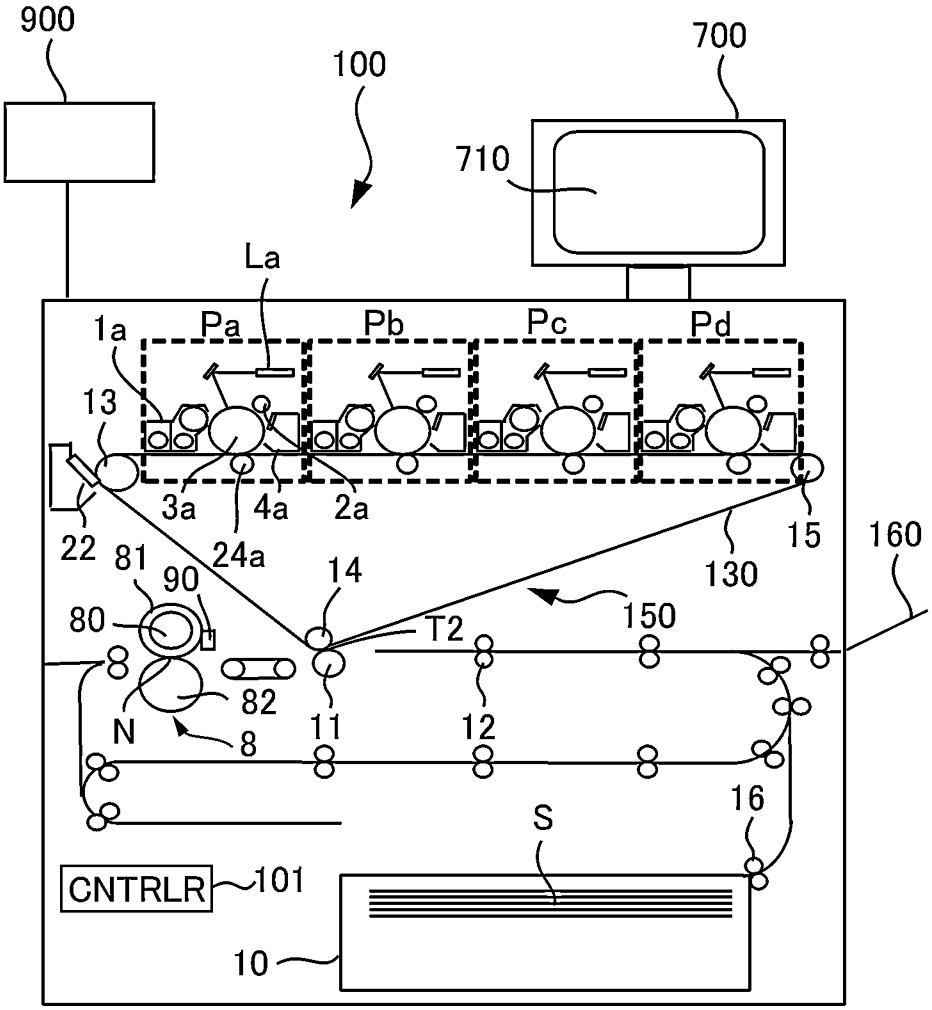
FIG. 1 is a schematic view showing an image forming apparatus of an embodiment.

In the following, a first embodiment will be described. First, an image forming apparatus 100 of this embodiment will be described. The image forming apparatus 100 is an electrophotographic full-color printer of a tandem type. The image forming apparatus 100 includes image forming stations Pa, Pb, Pc, and Pd for forming images of yellow, magenta, cyan, and black, respectively, as shown in FIG. 1. The image forming apparatus 100 forms a toner image on the recording material S on the basis of image data sent from an original reading device (not shown) connected to an apparatus main assembly or from an external device 900 such as a personal computer connected to the apparatus main assembly so as to be capable of inputting and outputting data.

As shown in FIG. 1, the image forming stations Pa, Pb, Pc, and Pd are juxtaposed along a movement direction of an intermediary transfer belt 130 in the image forming apparatus main assembly. The intermediary transfer belt 130 is stretched by a plurality of rollers (13, 14, 15) and is rotated. Then, the intermediary transfer belt 130 carries and conveys a toner image primary-transferred in a manner described later. At a position opposing, through the intermediary transfer belt 130, an inner secondary transfer roller 14 stretching the intermediary transfer belt 130, an outer secondary transfer roller 11 is disposed, so that a secondary transfer portion T2 where the toner image on the intermediary transfer belt 130 is transferred onto the recording material S is formed. On a side downstream of the secondary transfer portion T2 with respect to a recording material conveying direction, a fixing device 8 is provided.

The image forming apparatus 100 includes a cassette 10 in which recording materials S are set. The recording material S is supplied from the cassette 10 and is conveyed toward a registration roller pair 12 by a feeding roller 16. Thereafter, the registration roller pair 12 is started to be rotated in synchronism with the toner image formed on the intermediary transfer belt 130, so that the recording material S is conveyed toward the secondary transfer portion T2. A plurality of cassettes 10 capable of setting the recording materials S different in size and thickness may be provided, and in that case, the recording material S selected by a user is supplied from either one of the plurality of cassettes 10. Further, in the case of this embodiment, the recording set in a manual feeding tray 160 is supplied. Incidentally, as an option, an unshown recording material supplying apparatus is connected to the image forming apparatus 100 and the recording material set in the recording material supplying apparatus may be supplied to the image forming apparatus 100.

The four image forming stations Pa, Pb, Pd, and Pd provided in the image forming apparatus 100 have a substantially same constitution except that development colors are different from each other. Accordingly, in this embodiment, as a representative, the image forming portion Pa for yellow will be described, and other image forming stations Pb, Pc, and Pd will be omitted from description.

In the image forming station Pa for yellow, a cylindrical photosensitive drum 3*a* is provided. The photosensitive drum 3*a* is rotationally driven in a predetermined direction. At a periphery of the photosensitive drum 3*a*, a charging device 2*a*, an exposure device La, a developing device 1*a*, a primary transfer roller 24*a*, and a drum cleaning device 4*a* are provided.

A process for forming, for example, a full-color image by the image forming apparatus 100 will be described. First, when an image forming operation is started, a surface of the rotating photosensitive drum 3*a* is electrically charged uniformly by the charging device 2*a*. The charging device 2*a* is a corona charger or the like for charging the photosensitive drum 3*a* to a uniform negative dark-portion potential by irradiating the photosensitive drum 3*a* with charge particles with corona discharge, for example. Then, the photosensitive drum 3*a* is subjected to scanning exposure to laser light which is emitted from the exposure device La and which corresponds to an image signal. By this, an electrostatic latent image depending on the image signal is formed on the surface of the photosensitive drum 3*a*. The electrostatic latent image formed on the photosensitive drum 3*a* is developed into a toner image which is a visible image by a developer, containing toner and a carrier accommodated in the developing device 1*a*.

In the case of this embodiment, in the developing device 1*a*, as the developer, a two-component developer containing non-magnetic toner and a magnetic carrier is used. The toner contains a binder resin, a colorant, and a parting agent (wax). As the binder resin, a known binder resin can be used. For example, it is possible to use resin materials such as a vinyl copolymer represented by a styrene-(meth) acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow, magenta, cyan, and black, respectively.

As the parting agent, for example, it is possible to cite aliphatic hydrocarbon wax such as low-molecular weight polyethylene, low-molecular weight olefin copolymer wax, microcrystallin wax, Fischer-Tropsch wax, and paraffin wax; oxide of aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

The toner image formed on the photosensitive drum 3*a* is transferred onto the intermediary transfer belt 130 at a primary transfer portion formed between the intermediary transfer belt 130 and the photosensitive drum 3*a* opposing the primary transfer roller 24*a*. At this time, to the primary transfer roller 24*a*, a primary transfer voltage is applied. After the transfer on the intermediary transfer belt 130, toner remaining on the surface of the photosensitive drum 3*a* is removed by the drum cleaning device 4*a*.

Such an operation is sequentially performed in the image forming stations Pa, Pb, Pc, and Pd for yellow, magenta, cyan and black, respectively, so that four color toner images are superposed on the intermediary transfer belt 130. Thereafter, in synchronism with toner image forming timing, the recording material S set in the cassette 10 is conveyed to the secondary transfer portion T2. Then, by applying a secondary transfer voltage to the outer secondary transfer roller 11, the toner images for a full-color image are collectively secondary-transferred onto the recording material S. Toner remaining on the intermediary transfer belt 130 after the secondary transfer on the recording material S is removed by a belt cleaning device 22. Incidentally, in the case of this embodiment, an image forming portion 150 capable of forming the toner images on the recording material S is constituted by the image forming stations Pa to Pd, the intermediary transfer belt 130, the rollers (13, 14, 15), the outer secondary transfer roller 11, and the like.

The recording material S on which the toner images are formed is conveyed toward the fixing device 8 as a fixing means. The fixing device 8 includes a fixing roller 81 as a first rotatable motor and a pressing roller 82 as a second rotatable motor. The pressing roller 82 forms a fixing nip N in which the toner image is fixed by applying heat and pressure while nipping and conveying the recording material S in contact with the fixing roller 81. In the fixing roller 81, a heater 80 for heating the fixing roller 81 is provided, and a temperature sensor 90 for detecting a temperature of the fixing roller 81 is provided outside the fixing roller 81. The fixing roller 81 is disposed so as to be capable of being pressed by the pressing roller 82, and in the case of this embodiment, when the fixing roller 81 is driven by a rotation motor 810 (see FIG. 2) as a rotation driving portions, the pressing roller 82 is rotated by the fixing roller 81 at the same speed as a rotational speed of the fixing roller 81.

In the fixing device 8, at the fixing nip N formed by the pressing the fixing roller 81 by the pressing roller 82, the heat and the pressure are applied when the recording material S is nipped and conveyed, so that the toner image is fixed on the recording material S. The recording material S on which the toner image is fixed is discharged to an outside of the image forming apparatus 100. Incidentally, in this embodiment, the fixing device 8 using the fixing roller 81 and the pressing roller 82 was described as an example, but the fixing device 8 is not limited thereto, and may also be a fixing device using a fixing belt having an endless belt shape and a pressing belt.

Figure 2:
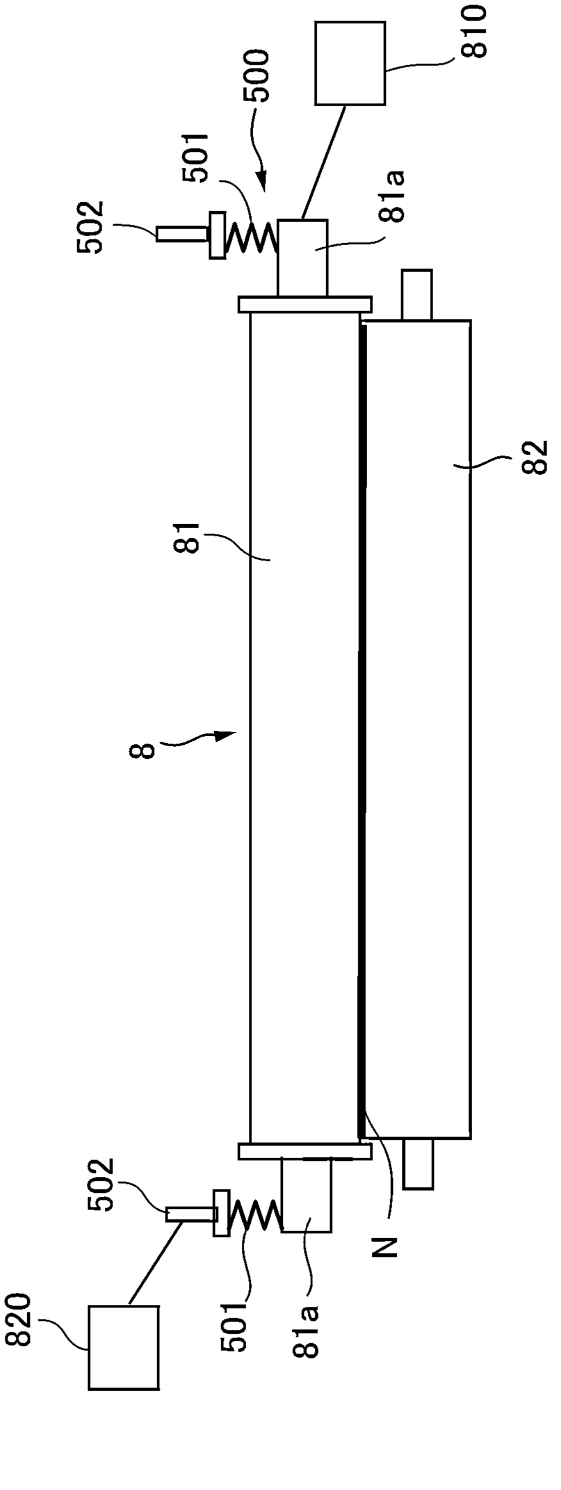
FIG. 2 is a schematic view showing a fixing device.

Next, a pressing mechanism 500 for pressing the fixing roller 81 against the pressing roller 82 will be described using FIG. 2. As shown in FIG. 2, the fixing roller 81 is pressed against the pressing roller 82 by the pressing mechanism 500 as a pressing portion. The pressing mechanism 500 is provided with a pair of the same fixing rollers 81 on opposite sides, and the pressing mechanism 500 includes a pair of pressing springs 501 and eccentric cams 502. Each of the eccentric cams 502 is rotated by a pressing motor 820 as a pressing driving portion, and the rotation thereof is stopped at a predetermined rotation angle.

The fixing roller 81 is rotatably borne by a bearing portion 81*a* on each of the opposite side of a rotation shaft thereof. In the case of this embodiment, the bearing portion 81*a* is urged toward the pressing roller 82 by the pressing spring 501, so that the fixing roller 81 is pressed against the pressing roller 82. The pressing spring 501 is capable of being expanded and contracted by being pressed in a pressing amount depending on the rotation angle of the eccentric cam 502. Accordingly, by controlling the pressing motor 820, the fixing roller 81 can be pressed against the pressing roller 82 by a desired pressing force.

<Controller>

The image forming apparatus 100 includes a controller 101, and the controller 101 controls the image forming apparatus 100, so that the toner image is formed on the recording material S. Therefore, control constitution of the image forming apparatus 100 will be described using FIG. 3 while making reference to FIG. 1. Incidentally, to the controller 101, in addition to the devices illustrated in FIG. 3, various devices such as sensors and power sources may be connected, but are not the main object of the present invention herein, and therefore, will be omitted from illustration and description.

The controller 101 includes a CPU 102 (central processing unit), a ROM (read only memory), and a RAM 104 (random access memory). In the ROM and the RAM 104, various programs and various data for a "image forming processing" (see FIG. 6) described later and the like are stored. Incidentally, the RAM 104 is capable of temporarily storing a calculation (computation) processing result or the like with execution of the various programs. In the case of this embodiment, as described later, the controller 101 is capable of executing an operation of a mode such that in the "image forming processing", an image is formed on a paste surface (first surface) and a toner image is formed on a front surface or a back surface (second surface) of a pressure-bonding postcard prepared by folding and bonding the recording material S.

The image forming apparatus 100 includes an operating portion 700 including, for example, a liquid crystal display portion 710, and the operating portion 700 is connected to the controller 101. The operating portion 700 is capable of displaying various programs, various data or various screens described later on the liquid crystal display portion 710. The operating portion 700 may be, for example or the like and is capable of receiving input of a start of the various programs such as an "image forming job" and input of the various data depending on a touch operation by the user.

Further, in this embodiment, an output portion 910 for performing, between the controller 101 and an external device 900, input of a start of the various programs such as the "image forming job" or data input/output of the various data such as image data and print setting is provided. Further, the output portion 910 is capable of causing a display portion of the external device 900 to display various screens described later. That is, the image forming apparatus 100 is capable of performing the image forming processing between itself and the external device 900 connected in a wireless or wired state by transmitting and receiving the data.

To the controller 101, in addition to the operating portion 700 and the output portion 910, the image forming portion 150, the heater 80, the temperature sensor 90, the rotational motor 810, and the pressing motor 820 are connected, and the controller 101 controls these devices. For example, in the case where the start of the "image forming job" is inputted from the operating portion 700 or the external device 900, the CPU 102 executes image forming processing (program) stored in the ROM 103. With this execution, the image forming portion 150 is operated, so that the toner image is formed on the recording material S.

Then, the controller 101 is capable of controlling a temperature of the fixing roller 81 to a predetermined target temperature by the heater 80 on the basis of the temperature of the fixing roller 81 detected by the temperature sensor 90. By this, a temperature, which is one of fixing conditions for fixing the toner image, applied to the recording material S when the recording material S is passed through the fixing nip N is changed. The controller 101 is capable of executing an operation in a first fixing mode in which the temperature of the fixing roller 81 is controlled to a first temperature by the heater 80 and an operation in a second fixing mode in which the temperature of the fixing roller 81 is controlled to a second temperature lower than the first temperature.

Further, the controller 101 is capable of adjusting a speed of the fixing roller 81 (and a speed of the pressing roller 82) by controlling the rotation motor 810. By this, a conveying speed, of the recording material S when the recording material S is passed through the fixing nip N, which is one of the fixing conditions for fixing the toner image is changed. The controller 101 is capable of executing an operation in a first fixing mode in which a rotational speed of the rotation motor 810 is controlled to a first speed and a second fixing mode in which the rotational speed of the rotation motor 810 is controlled to a second speed faster than the first speed.

Further, the controller 101 is capable of adjusting a pressing amount of the fixing roller 81 to the pressing roller 82 by controlling the pressing motor 820. By this, a pressure to the recording material S when the recording material S is passed through the fixing nip N, which is one of the fixing conditions for fixing the toner image is changed. The controller 101 is capable of executing an operation in a first fixing mode in which a pressing force of the pressing motor is controlled to a first pressing force and a second fixing mode in which the rotational speed of the pressing motor 820 is controlled to a second pressing force smaller than the first pressing force.

<Pressure-Bonding Postcard>

Next, the pressure-bonding postcard will be described. In this embodiment, as described later, the pressure-bonding postcard is used as the recording material S which is an image forming object. The pressure-bonding postcard is prepared by subjecting the recording material S to folding pseudo-bonding, but as a type for performing the pseudo-bonding, it is possible to cite a pasting type, a varnish type, a film type, for example. The pasting type is a type in which the pseudo-bonding is performed by applying a pressure-sensitive adhesive onto the recording material S and then by applying heat and pressure to the recording material S. The varnish type is a type in which the pseudo-bonding is performed by applying a UV curable varnish onto the recording material S and then by applying heat and pressure to the recording material S while irradiating the varnish with UV radiation. The film type is a type in which the pseudo-bonding is performed by inserting a heat-sensitive adhesive film between folded opposite surfaces of the recording material S and then by applying heat and pressure to the recording material S. Incidentally, in the following, for easy understanding, the case where the pressure-bonding postcard as a pressure-bonding print (pressure-bonding printed matter) is prepared by using a pressure-bonding sheet of a pre-paste type in which paste is applied in advance onto the pressure-bonding sheet will be described as an example.

First, the pressure-bonding sheet used for preparing the pressure-bonding postcard will be described using parts (a) and (b) of FIG. 4. Part (a) of FIG. 4 shows a pressure-bonding sheet of a whole area pasting type for V-fold (two-fold), and part (b) of FIG. 4 shows a pressure-bonding sheet of an edge pasting type for V-fold (two-fold). In each of parts (a) and (b) of FIG. 4, an upper stage shows a first side (surface), and a lower stage shows a second side (surface). Incidentally, a symbol X in each of parts (a) and (b) of FIG. 4 represents an adhesive region, i.e., a paste application region of the pressure-bonding sheet.

As shown in parts (a) and (b) of FIG. 4, as regards the pressure-bonding sheet of the pre-paste type, an adhesive layer (adhesive region) is formed on a base material. The base material may only be required to be a sheet or the like on which the adhesive layer is formed on at least one surface thereof, and for example, it is possible to cite high-quality paper, medium-quality paper, coated paper, and the like. Further, from a viewpoint of confidentiality of information, it is desirable that the base material does not transmit light and thus a confidential image (image relating to information desired to be kept secret by a user) formed on a first side is not readily seen through a second side.

The adhesive layer is a pressure-sensitive adhesive for pseudo-bonding the pressure-bonding sheet under pressure, and the pressure-sensitive adhesive includes an adhesive base material and an adhesive force adjusting agent. As the adhesive base material, for example, a composition in which a natural rubber latex, a modified product thereof, a synthetic rubber latex, a synthetic resin, or the like is mixed is used, and the adhesive base material exhibits an adhesive force. The adhesive force adjusting agent is a fine-particulate filler including fine particles of a known wax such as a paraffin wax, silica, titanium oxide, calcium carbonate, or the like. Each of these materials is low in affinity for the adhesive base material, and is filled for adjusting the adhesive force of the pressure-sensitive adhesive.

The fine-particulate filler contained in the adhesive base material projects from the adhesive base material, so that an uneven shape is formed on a surface of the adhesive layer. By this uneven shape, during no application of the pressure, the adhesive base material does not appear at the adhesive layer surface, and therefore, an adhesive property is not exhibited. On the other hand, when opposite surfaces on which the adhesive layer is applied are folded and pressed each other, the adhesive base material under the uneven portion appears at the adhesive layer surface, and therefore, the adhesive base material and the opposite adhesive base material or the opposite adhesive force adjusting agent contact each other, so that the adhesive property is exhibited. Incidentally, when inexpensiveness of the pressure-bonding postcard than sealed letter in terms of transportation cost such as postage is taken into account, a basis weight of the recording material S including the base material and the adhesive layer in combination may desirably be, for example, "64 $g/m^2$ to 209 $g/m^2$".

<Paste Application Region>

As shown in part (a) of FIG. 4, as regards the pressure-bonding sheet of the whole area pasting type, paste is applied onto a substantially "whole area" of the recording material S. The pressure-bonding sheet of the whole area pasting type is covered with the adhesive layer at a substantially entire surface on one side thereof. On the other hand, as shown in part (b) of FIG. 4, onto the pressure-bonding sheet of the edge pasting type, paste is applied at an edge of the recording material S. As regards the pressure-bonding sheet of the edge pasting type, the paste is applied along the edge on one surface side, and is not applied at a portion other than the edge.

The pressure-bonding sheet for the two-fold has a front-back constitution including paste surfaces (801, 802) which are shown in the upper stage and on which the paste is applied and including non-paste surfaces (803, 804) which are shown in the lower stage and on which the paste is not applied. The pressure-bonding sheet is, for example, folded on the paste surfaces in a valley, i.e., in two, at a position of a fold Sal between a first region 801 and a second region 802. In this case, a confidential image, such as personal information, desired to be kept secret by the user is formed on the paste surfaces (first region 801, second region 802), and a non-confidential image, such as an address, which is not required to be kept secret by the user is formed on the non-paste surfaces (third region 803, fourth region 804).

Next, a process for preparing the pressure-bonding postcard with use of the pressure-bonding sheet of the edge pasting type will be described. Parts (a) to (d) of FIG. 5 are schematic views for illustrating the preparing process (steps) of the pressure-bonding postcard.

Part (a) of FIG. 5 shows a state in which the confidential image is formed on the pressure-bonding sheet, part (b) of FIG. 5 shows a state in which the pressure-bonding sheet is subjected to folding processing, part (c) of FIG. 5 shows a cross section of the pressure-bonding postcard, and part (d) of FIG. 5 shows a state in which the non-confidential image is formed on the pressure-bonding sheet.

First, as shown in part (a) of FIG. 5, on the paste surfaces (801, 802) of the pressure-bonding sheet, toner images of a "sun mark" and a "face mark" are formed. Then, the pressure-bonding sheet is, as shown in part (b) of FIG. 5, folded in a valley in two at the position of Sal between the first region 801 and the second region 802. Then, as shown in part (c) of FIG. 5, the pressure-bonding sheet subjected to the folding processing is subjected to pressure-bonding processing, so that a pressure-bonding postcard including the "sun mark" and the "face mark" formed on the paste surfaces (801, 802) is prepared. In the pressure-bonding postcard, a state in which the "sun mark" and the "face mark" contact each other is formed. Thereafter, the user sets the prepared pressure-bonding postcard in the cassette 10 or on the manual feeding tray 160 (see FIG. 1), and the non-confidential image is formed on a front surface or a back surface. In this case, as the non-confidential image, a toner image of "ADD (ADDRESS)" is formed on the non-paste surface (803) as shown in part (d) of FIG. 5.

Incidentally, in order to fix the toner image of the "ADD" on the non-paste surface (803) of the pressure-bonding postcard, to the pressure-bonding postcard, head and pressure are applied by the fixing device 8 after the toner image formation. At this time, to the "sun mark" and the "face mark" formed on the paste surfaces (801, 802) of the pressure-bonding postcard, heat and pressure are applied again in a state in which these marks contact each other. Then, a part of the toner of the “sun mark” and the “face mark” is melted by the heat, and thus the “sun mark” and the “face mark” stick to each other, so that when the pressure-bonding postcard is peeled off, a part of the toner is transferred from one surface to the other surface. Particularly, in the case where the toner image such as the address is formed as the non-confidential image on the pressure-bonding postcard prepared using the pressure-bonding sheet of the edge pasting type, there was a liability that the confidential image causes peeling-off of the toner thereof. Therefore, in the case where the toner image such as the address or the like is formed on the pressure-bonding postcard on which the toner image as the confidential image has already been formed, there was a need to prevent occurrence of the peeling-off of the toner from the toner image (confidential image) during unsealing of the pressure-bonding postcard. In the following, this embodiment for realizing the prevention of occurrence of the peeling-off will be described.

<Image Forming Processing>

Figure 3:
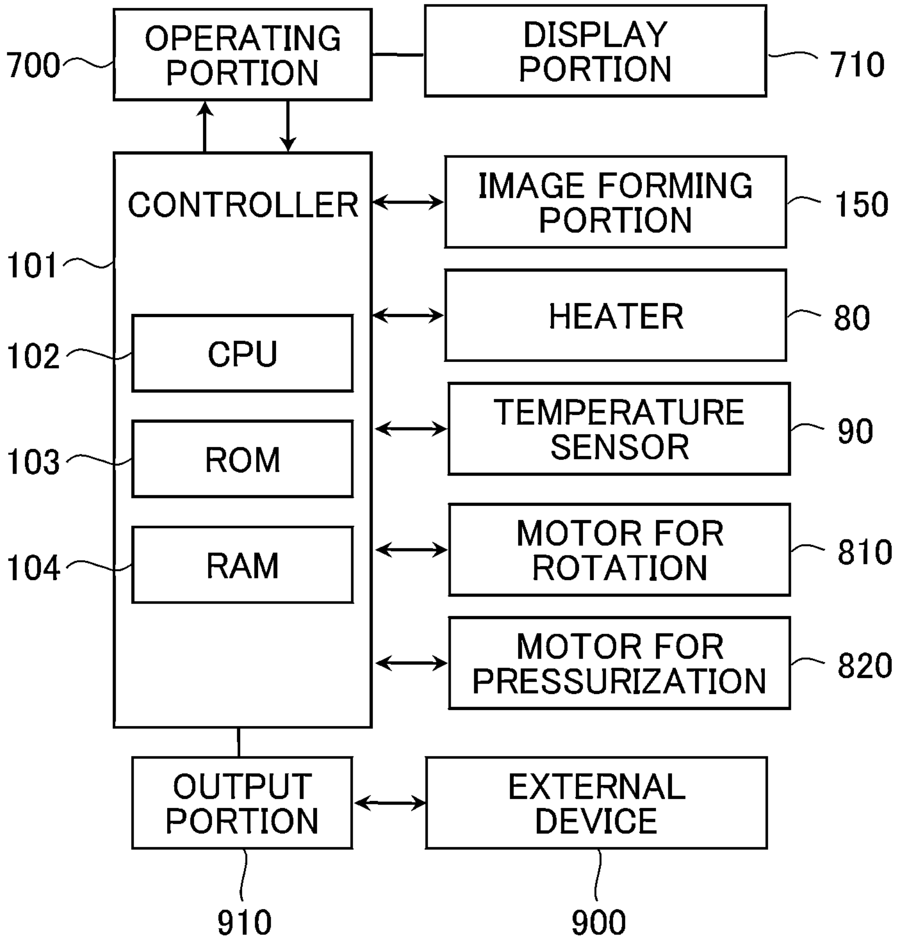
FIG. 3 is a control block diagram control constitution of the image forming apparatus.

The “image forming processing” of the first embodiment will be described using FIG. 6 to part (b) of FIG. 11 while making reference to FIG. 3. The “image forming processing” of this embodiment is started by the controller 101 during main switch actuation (turning-on of a power source) of the image forming apparatus 100 or during restoration from a sleep state of the image forming apparatus 100, for example.

As shown in FIG. 6, the controller 101 causes the user to select the recording material S which is the image forming object (S1). At this time, the controller 101 causes the liquid crystal display portion 710 to display a screen for causing the user to select the recording material S which is the image forming object. In this embodiment, the “set portion selecting screen” (see FIG. 7) on which a set portion where the recording material S is set is selected by the user and the “RECORDING MATERIAL KIND SELECTING SCREEN” (see FIG. 8) on which a kind of the recording material S set at the selected set portion is selected by the user are displayed. In the “SET PORTION SELECTING SCREEN” shown in FIG. 7, the user is capable of selecting either one of, for example, “MANUAL FEEDING”, “CASSETTE 1”, and “CASSETTE 2” from “SHEET SETTING” (sheet (paper) feeding setting). Then, when a “SETTING” button is operated by the user, the screen is changed to the “RECORDING MATERIAL KIND SELECTING SCREEN” shown in FIG. 8.

In the “RECORDING MATERIAL KIND SELECTING SCREEN” shown in FIG. 8, the user is capable of selecting, as a “KIND OF RECORDING MATERIAL”, “HQP” (high quality paper), medium quality paper, and coated paper including “P. P.” (plain paper), “T. P.” (thick paper), “PC” (postcard), or the like. Then, in the case where the toner image (non-confidential image) is formed on the front surface or the back surface of the pressure-bonding postcard on which the confidential image has already been formed, the user selects the “PC” as the “KIND OF RECORDING MATERIAL”, and then operates an “On” button of “PB-POSTCARD SETTING” (pressure-bonding postcard setting). By this, the “pressure-bonding postcard” is selected as the recording material S which is the image forming object. Incidentally, a default setting of the “PB-POSTCARD SETTING” is “Off”, and when the “On” button is not operated, the recording material S which is not subjected to the pressure-bonding is selected.

The controller 101 discriminates whether or not the “pressure-bonding postcard” is selected by the user (S2). In the case where the “pressure-bonding postcard” is not selected (No of S2), the controller 101 causes the image forming apparatus to start image formation of the toner image on the recording material S which is set at the selected set portion and which is not subjected to the pressure-bonding (S8). On the other hand, in the case where the “pressure-bonding postcard” is selected (Yes of S2), the controller 101 discriminates whether or not the “pasting surface printing type” is “toner” (S3), and then discriminates whether or not a “pasting region” (paste applying region) is “edge pasting” (S4). Whether or not the “pasting surface printing type” is the “toner” and whether or not the “pasting region” is the “edge pasting” are selectively set by the user from the “PB-POSTCARD SETTING” screen shown in part (a) of FIG. 9.

The “PB-POSTCARD SETTING” screen shown in part (a) of FIG. 9 is displayed at the liquid crystal display portion 710 in the case where the “pressure-bonding postcard” is selected by operating the “On” button of the “PB-POSTCARD SETTING” in the “SETTING OF KIND OF RECORDING MATERIAL” screen shown in FIG. 8. As shown in part (a) of FIG. 9, in the “PB-POSTCARD SETTING” screen, the user is capable of selectively setting, as “DETAILS OF PRESSURE BONDING (PROCESSING)”, the “PASTING SURFACE PRINT TYPE” and the “PASTING REGION”. When the user operates a screen of a column of “CONTENTS OF PROCESSING” corresponding to items of the “DETAILS OF PRESSURE BONDING”, pull-down buttons shown in parts (a) and (b) of FIG. 10 are displayed at the liquid crystal display portion 710, and the user is capable of selecting a desired one of the contents of processing by operating the pull-down buttons.

Part (a) of FIG. 10 shows a selecting screen (first screen) of the contents of processing of the “PASTING SURFACE PRINT TYPE”, in which two items of “toner” in the case where the confidential image is formed with the “toner” and “ink” in the case where the confidential image is formed with ink are selectable. In an example shown in part (a) of FIG. 10, the “toner” is selected. Part (b) of FIG. 10 shows a selecting screen (second screen) of the contents of processing of the “PASTING REGION”, in which two items as to whether or not the paste applying region in the pressure-bonding postcard is the “WHOLE AREA PASTING” or “EDGE PASTING”. In an example shown in part (b) of FIG. 10.

Incidentally, in the “DETAILS OF PRESSING BONDING”, an item other than the above-described “PASTING SURFACE PRINT TYPE” and “PASTING REGION” may be displayed. However, in the case of this embodiment, there is a need that the user is capable of selecting a combination of the “toner” as the “PASTING SURFACE PRINT TYPE” and the “EDGE PASTING” as the “PASTING REGION”. Further, in preparation for the case where the user cannot understand a setting method as to a processing method of the “pressure-bonding postcard”, a “HELP” button is displayed in the “PB-POSTCARD SETTING” shown in part (a) of FIG. 9. In the case where the “HELP” button is operated by the user, the controller 101 causes the liquid crystal display portion 710 to display the “HELP” screen shown in part (b) of FIG. 9. In the “HELP” screen, an image showing the “WHOLE AREA PASTING” and the “EDGE PASTING” for the “PASTING REGION” of the pressure-bonding postcard, an image showing the cross section of the pressure-bonding postcard subjected to the folding, a picture image of the pressure-bonding postcard on which the non-confidential image is formed, and the like image are displayed. Incidentally, in the "PB-POSTCARD SETTING" screen shown in part (a) of FIG. 9, the "PAST SURFACE PRINT TYPE" and the "PASTING REGION" are determined by operating an "OK" button by the user.

Returning to description of FIG. 6, in the case where the "PASTING SURFACE TYPE" is not the "TONER" (No of S3) or in the case where the "PASTING SURFACE PRINT TYPE" is the "TONER" but the "PASTING REGION" is the "WHOLE AREA PASTING" (Yes of S3 and No of S4), the controller 101 causes the image forming apparatus to start image formation of the toner image on the pressure-bonding postcard set at the selected set portion (S8). At this time, the pressure-bonding postcard which is the image forming object is a pressure-bonding postcard for which the confidential image is not the toner image formed with the toner but is an image formed with the ink (No of S3) or a pressure-bonding postcard for which the confidential image is the toner image but the pasting region is the whole area pasting (No of S4). In such cases of the pressure-bonding postcard for which the confidential image is formed with the ink and the pressure-bonding postcard for which the pasting region is the whole area pasting, even when the toner image is formed on the front surface or the back surface of the pressure-bonding postcard, there is no liability that the confidential image causes the peeling-off during the unsealing of the pressure-bonding postcard. Therefore, in the cases of such pressure-bonding postcards, the image formation of the toner image on the front surface or the back surface of the pressure-bonding postcard is started.

On the other hand, in the case where the "PASTING SURFACE PRINT TYPE" is the "TONER" (Yes of S3) and the "PASTING REGION" is the "EDGE PASTING" (Yes of S4), the controller 101 causes the liquid crystal display portion 710 to display a "WARNING SCREEN" (see FIG. 11) (S5). Then, in accordance with user selection from the "WARNING SCREEN", the controller discriminates whether or not the toner image such as the address is formed as the non-confidential image on the pressure-bonding postcard prepared by using the pressure-bonding sheet of the edge pasting type (S6). In the case where the toner image is formed (Yes of S6), the controller 101 causes the image forming apparatus to start the image formation of the toner image on the pressure-bonding postcard. In the case where the toner image is not formed (No of S6), the controller 101 ends the processing with no start of the toner image formation on the pressure-bonding postcard.

In FIG. 11, an example of the "WARNING SCREEN" is shown. As shown in FIG. 11, in the "WARNING SCREEN", as information to the effect that abnormality occurs when the pressure-bonding postcard on which the toner image is formed on the front surface or the back surface thereof is unsealed, warning to the effect that there is a possibility that peeling-off of the toner from the confidential image occurs during the unsealing of the pressure-bonding postcard is displayed. This is because was described above, in the case of the pressure-bonding postcard or which the confidential image is the toner image and the pasting region is the edge pasting, when the toner image is formed on the front surface or the back surface of the pressure-bonding postcard, there is a possibility of occurrence of the peeling-off of the toner from the confidential image when the pressure-bonding postcard is unsealed.

Further, on the "WARNING SCREEN", simultaneously with the above-described warning display, as a screen (third screen) in which execution or non-execution of the image formation is selectable, a "PRINT" button and a "CANCEL" button are displayed. The user confirmed the warning display may only be required to operate the "PRINT" button in the case where the user executes the formation of the image on the pressure-bonding postcard as it is, and may only be required to operate the "CANCEL" button in the case where the formation of the image on the pressure-bonding postcard is stopped.

As described, in this embodiment, in the case where the image is formed on the front surface or the back surface of the pressure-bonding postcard for which the confidential image is the toner image formed with the toner and the pasting region is the "EDGE PASTING", the warning screen is displayed on the liquid crystal display portion 710 before execution of the image formation. Then, by the warning display displayed on the warning screen, the user is caused to recognize that "THERE IS POSSIBILITY OF PEELING-OFF OF TONER FROM (CONFIDENTIAL) IMAGE", and the user is caused to select execution or non-execution of the formation of the image on the pressure-bonding postcard. Thus, by displaying the warning that "THERE IS POSSIBILITY OF PEELING-OFF OF TONER FROM IMAGE", the user can be caused to select non-execution of the formation of the image on the pressure-bonding postcard. Then, the user recognizes that "THERE IS POSSIBILITY OF PEELING-OFF OF TONER FROM IMAGE", and then is capable of executing the image formation on the pressure-bonding postcard. By this, in this embodiment, it is possible to suppress that a useless pressure-bonding postcard is prepared.

Second Embodiment

In the above-described embodiment, the user recognizes that "THREE IS POSSIBILITY OF PEELING-OFF OF TONER FROM IMAGE", and then is capable of executing the image formation on the pressure-bonding postcard, so that the possibility of occurrence of the peeling-off of the toner from the confidential image when the pressure-bonding postcard after the image formation is unsealed is still large. Therefore, when the execution of the formation of the image on the pressure-bonding postcard is selected and then the toner image (non-confidential image) is formed on the front surface and the back surface of the pressure-bonding postcard, it is preferable that the image is formed on the pressure-bonding postcard so as not to cause the occurrence of the peeling-off in the confidential image during the unsealing of the pressure-bonding postcard.

Therefore, "image forming processing" of a second embodiment for realizing this will be described using FIGS. 12 to 16 while making reference to FIG. 3. Incidentally, the same processes as those in the "image forming processing" of the above-described first embodiment will be briefly described or omitted from description by adding the same step numbers thereof.

As shown in FIG. 12, the controller 101 causes the user to select the recording material S which is the image forming object (S1). At this time, the controller 101 causes the liquid crystal display portion 710 to display, the "set portion selecting screen" (see FIG. 7) on which a set portion where the recording material S is set is selected by the user and the "RECORDING MATERIAL KIND SELECTING SCREEN" (see FIG. 8) on which a kind of the recording material S set at the selected set portion is selected by the user are displayed. The controller 101 discriminates whether or not the "pressure-bonding postcard" is selected by the user (S2). In the case where the "pressure-bonding postcard" is not selected (No of S2), the controller 101 causes the image forming apparatus to start image formation of the toner image on the recording material S which is set at the selected set portion and which is not subjected to the pressure-bonding (S8).

On the other hand, in the case where the "pressure-bonding postcard" is selected (Yes of S2), the controller 101 discriminates whether or not the "pasting surface printing type" is "toner" (S3), and then discriminates whether or not a "pasting region" (paste applying region) is "edge pasting" (S4). Whether or not the "pasting surface printing type" is the "toner" and whether or not the "pasting region" is the "edge pasting" are selectively set by the user from the "PB-POSTCARD SETTING" screen shown in part (a) of FIG. 9.

In the case where the "PASTING SURFACE TYPE" is not the "TONER" (No of S3) or in the case where the "PASTING SURFACE PRINT TYPE" is the "TONER" but the "PASTING REGION" is the "WHOLE AREA PASTING" (Yes of S3 and No of S4), the controller 101 causes the image forming apparatus to start image formation of the toner image on the pressure-bonding postcard set at the selected set portion (S8). In this case, even when the toner image is formed on the front surface or the back surface of the pressure-bonding postcard, there is no liability that the confidential image causes the peeling-off during the unsealing of the pressure-bonding postcard. On the other hand, in the case where the "PASTING SURFACE PRINT TYPE" is the "TONER" (Yes of S3) and the "PASTING REGION" is the "EDGE PASTING" (Yes of S4), the controller 101 causes the liquid crystal display portion 710 to display a "WARNING SCREEN" (S5).

As shown in FIG. 11, in the "WARNING SCREEN", as information to the effect that abnormality occurs when the pressure-bonding postcard on which the toner image is formed on the front surface or the back surface thereof is unsealed, warning to the effect that there is a possibility that peeling-off of the toner from the confidential image occurs during the unsealing of the pressure-bonding postcard is displayed.

Further, on the "WARNING SCREEN", a "PRINT" button and a "CANCEL" contact are displayed. Further, in the case of the second embodiment, on the "WARNING SCREEN", a "processing option" button is displayed. When the "processing option" is operated by the user, the screen of the liquid crystal display portion 710 is changed to a "PROCESSING OPTION" selection screen shown in part (a) of FIG. 13. That is, the "PROCESSING OPTION" button is an example of a selection screen on which the user is capable of selecting whether or not the screen of the liquid crystal display portion 710 is changed from the "WARNING SCREEN" to the "processing option selection screen".

The "processing option selection screen" is a change screen on which the user is capable of changing a fixing condition in which the toner image is fixed when the formation of the image on the pressure-bonding postcard is executed is changeable, and the user is capable of selecting "LOWER FIXING TEMPERATURE" as the fixing condition. Then, in the case where the user selects the "LOWER FIXING TEMPERATURE", a "CHANGE IN FIXING TEMPERATURE" screen shown in part (b) of FIG. 13 is displayed at the liquid crystal display portion 710 in a pop-up manner. On the "CHANGE IN FIXING TEMPERATURE" screen, as a fixing mode, a "STANDARD: PB-POSTCARD" mode, a "REDUCTION 1: POSTCARD" mode, and a "REDUCTION 2: PLAIN PAPER" are selectably displayed. Incidentally, a "STANDARD SETTING" of the "processing option selection screen" is a fixing condition determined in advance for the formation of the image on the pressure-bonding postcard.

FIG. 14 is a graph showing a specific example of a temperature of the fixing roller 81, in each of the "STANDARD: PB-POSTCARD" mode, the "REDUCTION 1: POSTCARD" mode, and the "REDUCTION 2: PLAIN PAPER". As shown in FIG. 14, in the case of this embodiment, in the "STANDARD: PB-POSTCARD" mode, the temperature of the fixing roller 81 is "200° C." by default, and the temperature of the fixing roller 81 is set to "180° C." when the "REDUCTION 1: POSTCARD" mode is selected and is set to "160° C." when the "REDUCTION 2: PLAIN PAPER" mode is selected.

Returning to description of FIG. 12, as described above, in the case of the second embodiment, the controller 101 causes the liquid crystal display portion 710 to display the "WARNING SCREEN" including the "PROCESSING OPTION" button (S5). When the "PROCESSING OPTION" button is operated by the user, the controller 101 pressures that a change in screen of the liquid crystal display portion 710 from the "WARNING SCREEN" is selected, the controller 101 causes the liquid crystal display portion 710 to display the "PROCESSING OPTION" selection screen (see part (a) of FIG. 13). Then, the controller 101 discriminates whether or not the "LOWERING FIXING TEMPERATURE" button of the "PROCESSING OPTION" selection screen is selected by the user (S21).

In the case where the "LOWERING FIXING TEMPERATURE" button of the "PROCESSING OPTION" selection screen is not selected (Yes of S21), the controller 101 causes the processing to go to the processing of the step S6. In this case, the controller 101 does not lower the temperature of the fixing roller 81 from the temperature in the "STANDARD: PB-POSTCARD" mode.

On the other hand, in the case where the "LOWERING FIXING TEMPERATURE" button of the "PROCESSING OPTION" selection screen is selected (Yes of S21), the controller 101 causes the liquid crystal display portion to display the "CHANGING IN FIXING TEMPERATURE" screen in a pop-up manner, and prompts the user to make a processing option setting (S22). Then, depending on selection of either one of the "REDUCTION 1: POSTCARD" mode and the "REDUCTION 2: PLAIN PAPER" mode as the processing option setting by the user, the controller 101 changes, as the fixing condition the temperature of the fixing roller 81 (S23) and causes the processing to go to the processing of the step S6. In this case, the controller 101 lowers the temperature of the fixing roller 81 from the temperature in the "STANDARD: PB-POSTCARD" mode.

Then, in accordance with the selection from the "WARNING SCREEN" (see FIG. 11) by the user, the controller 101 discriminates whether or not as the non-confidential image, the toner image such as the address should be formed on the pressure-bonding postcard prepared by using the pressure-bonding sheet of the edge pasting type (S6). In the case where the "PRINT" button is operated and thus the toner image should be formed (Yes of S6), the controller 101 causes the image forming apparatus to start formation of the toner image on the pressure-bonding postcard (S7). At this time, the controller 101 is capable of suppressing toner of a part of the confidential image from melting by lowering the fixing temperature. Thus, the fixing condition is changed to a fixing condition in which the toner is not readily peeled off from the confidential image, and thus the formation of the toner image is carried out. Incidentally, in the case where the "CANCEL" button is operated and the toner image is not formed (No of S6), the controller 101 ends the processing with no start of the formation of the toner image on the pressure-bonding postcard.

As described, also in the second embodiment, similarly as in the above-described first embodiment, in the case where the image is formed on the front surface or the back surface of the pressure-bonding postcard for which the confidential image is the toner image formed with the toner and the pasting region is the "EDGE PASTING", the warning screen is displayed before execution of the image formation. Then, the user recognizes that "THERE IS POSSIBILITY OF PEELING-OFF OF TONER FROM IMAGE", and then is capable of executing the image formation on the pressure-bonding postcard. However, in the second embodiment, as the fixing condition, the fixing temperature is lowered, so that the formation of the toner image on the pressure-bonding postcard is made executable. When the fixing condition is changed, during the image formation, it is possible to suppress that the toner of a part of the confidential image (toner image) on the pressure-bonding postcard is not readily peeled off when the pressure-bonding postcard is unsealed. Accordingly, it is possible to suppress that a useless pressure-bonding postcard is prepared.

Incidentally, in the case of the above-described second embodiment, on the "PROCESSING OPTION" selection screen (see part (a) of FIG. 13), as the fixing condition, the user is capable of selecting an "INCREASE CONVEYING SPEED" button and a "LOWERING FIXING PRESSURE" button in addition to the "LOWERING FIXING TEMPERATURE" button. In the case where the user selects the "INCREASE CONVEYING SPEED", although illustration is omitted, a "conveying speed changing screen" on which three items consisting of the "STANDARD: PB-POSTCARD" mode, the "REDUCTION 1: POSTCARD" mode, and the "REDUCTION 2: PLAIN PAPER" mode are selectably displayed is displayed at the liquid crystal display portion 710. In the case of this embodiment, in an operation in the "STANDARD: PB-POSTCARD" mode, a rotational speed of the rotation motor 810 is a "low speed" by default, and the rotational speed of the rotation motor 810 is set to a "medium speed" when the "REDUCTION 1: POSTCARD" mode is selected and is set to a "high speed" when the "REDUCTION 2: PLAIN PAPER" mode is selected.

Further, in the case where the user selects the "LOWERING FIXING PRESSURE" button, although illustration is omitted, a "fixing pressure changing screen" on which three items consisting of the "STANDARD: PB-POSTCARD" mode, the "REDUCTION 1: POSTCARD" mode, and the "REDUCTION 2: PLAIN PAPER" mode are selectably displayed is displayed at the liquid crystal display portion 710. In the case of this embodiment, in an operation in the "STANDARD: PB-POSTCARD" mode, a pressing force of the pressing motor is a "high pressure" by default, and the pressing force of the pressing motor is set to a "medium pressure" when the "REDUCTION 1: POSTCARD" mode is selected and is set to a "low pressure" when the "REDUCTION 2: PLAIN PAPER" mode is selected.

Incidentally, on the "PROCESSING OPTION" selection screen, the user may also be caused to select the "LOWERING FIXING TEMPERATURE" button, the "INCREASE CONVEYING SPEED" button, and the "LOWERING FIXING PRESSURE" button in combination. That is, when a plurality of fixing conditions are made selectable in combination, the peeling-off in the confidential image becomes further difficult to occur and thus is preferable.

Incidentally, the above-described first and second embodiments are not limited to application to the pressure-bonding postcard folded in the V-shape (two fold), but may also be applicable to, for example, pressure-bonding postcards folded in a Z-shape and in a reverse Z-shape.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-084113 filed on May 22, 2023, which is hereby incorporated by reference herein in its entirety.

What is claimed is:

1. An image forming apparatus comprising:

an image forming portion configured to form an image on a recording material;

a fixing portion configured to fix the image, on the recording material, formed by the image forming portion;

an input portion to which a kind of a pressure-bonding print which is the recording material on which the image is formed on a surface thereof and which is folded and bonded at the surface is inputted;

a display portion configured to display a message; and a controller configured to cause the display portion to display a message before the image is formed on the pressure-bonding print when the kind of the pressure-bonding print inputted by the input portion is a first kind such that an adhesive is applied to a first region of the surface and is not applied to a second region inside the first region in a case that the image is formed on the pressure-bonding print by the image forming portion, wherein the controller causes the display portion to display a screen for setting a fixing condition for fixing the pressure-bonding print in a case that the image is formed on the pressure-bonding print of the first kind, wherein the controller is capable of controlling, as the fixing condition, a fixing temperature when the pressure-bonding print is fixed, wherein the controller causes the display portion to display a screen such that the fixing temperature is settable to a first temperature in a case that the kind of the pressure-bonding print is the first kind and that the fixing temperature is settable to a second temperature in a case that the kind of the pressure-bonding print is a second kind such that the adhesive is applied to the first region of the surface and is applied to the second region, and wherein the first temperature is lower than the second temperature.

2. The image forming apparatus according to claim 1, wherein the controller causes the display portion to display the message before the image is formed on the pressure-bonding print when the image formed on the surface of the pressure-bonding print inputted to the input portion is formed with toner.

3. The image forming apparatus according to claim 1, wherein the controller executes formation of the image on the pressure-bonding print when the kind of the pressure-bonding print inputted to the input portion is a second kind such that the adhesive is applied to the first region of the surface and is applied to the second region.

4. The image forming apparatus according to claim 1, wherein the controller causes the display portion to notify, as the message, that there is a possibility that a defect occurs, in the image formed on the surface, when the pressure-bonding print is unsealed in a case that formation of the image on the pressure-bonding print is executed.

5. The image forming apparatus according to claim 1, wherein the controller causes the display portion to display the message and causes a user to select whether or not formation of the image on the pressure-bonding print is executed.

6. The image forming apparatus according to claim 1, wherein the controller is capable of controlling, as the fixing condition, a conveying speed when the pressure-bonding print is fixed, wherein the controller causes the display portion to display a screen such that the conveying speed is settable to a first speed in a case that the kind of the pressure-bonding print is the first kind and that the conveying speed is settable to a second speed in a case that the kind of the pressure-bonding print is a second kind such that the adhesive is applied to the first region of the surface and is applied to the second region, and wherein the first speed is slower than the second speed.

7. The image forming apparatus according to claim 1, wherein the controller is capable of controlling, as the fixing condition, a fixing pressure when the pressure-bonding print is fixed, wherein the controller causes the display portion to display a screen such that the fixing pressure is settable to a first pressure in a case that the kind of the pressure-bonding print is the first kind and that the fixing temperature is settable to a second pressure in a case that the kind of the pressure-bonding print is a second kind such that the adhesive is applied to the first region of the surface and is applied to the second region, and wherein the first pressure is lower than the second pressure.

8. An image forming apparatus comprising:

an image forming portion configured to form an image on a recording material;

a fixing portion configured to fix the image, on the recording material, formed by the image forming portion;

an input portion to which a kind of the image to be formed on a pressure-bonding print which is the recording material on which the image is formed on a surface thereof and which is folded and bonded at the surface is inputted;

a display portion configured to display a message; and a controller configured to cause the display portion to display a message before the image is formed on the pressure-bonding print when the kind of the image to be formed on the pressure-bonding print inputted by the input portion is toner in a case that the image is formed on the pressure-bonding print by the image forming portion, wherein the controller causes the display portion to display a screen for setting a fixing condition for fixing the pressure-bonding print in a case that the image is formed on the pressure-bonding print on which the image is formed with the toner, wherein the controller is capable of controlling, as the fixing condition, a fixing temperature when the pressure-bonding print is fixed, wherein the controller causes the display portion to display a screen such that the fixing temperature is settable to a first temperature in a case that the image is formed on the pressure-bonding print on which the image is formed with the toner and that the fixing temperature is settable to a second temperature in a case that the image is formed on the pressure-bonding print on which the image is formed with ink, and wherein the first temperature is lower than the second temperature.

9. The image forming apparatus according to claim 8, wherein the controller causes the display portion to notify, as the message, that there is a possibility that a defect occurs, in the image formed on the surface when the pressure-bonding print is unsealed in a case that formation of the image on the pressure-bonding print is executed.

10. The image forming apparatus according to claim 8, wherein the controller causes the display portion to display the message and causes a user to select whether or not formation of the image on the pressure-bonding print is executed.

11. The image forming apparatus according to claim 8, wherein the controller is capable of controlling, as the fixing condition, a conveying speed when the pressure-bonding print is fixed, wherein the controller causes the display portion to display a screen such that the conveying speed is settable to a first speed in a case that the image is formed on the pressure-bonding print on which the image is formed with the toner and that the conveying speed is settable to a second speed in a case that the image is formed on the pressure-bonding print on which the image is formed with ink, and wherein the first speed is slower than the second speed.

12. The image forming apparatus according to claim 8, wherein the controller is capable of controlling, as the fixing condition, a fixing pressure when the pressure-bonding print is fixed, wherein the controller causes the display portion to display a screen such that the fixing pressure is settable to a first pressure in a case that the image is formed on the pressure-bonding print on which the image is formed with the toner and that the fixing temperature is settable to a second pressure in a case that the image is formed on the pressure-bonding print on which the image is formed with the ink, and wherein the first pressure is lower than the second pressure.

* * * * *